US010476078B2

United States Patent
Choi et al.

(10) Patent No.: US 10,476,078 B2
(45) Date of Patent: Nov. 12, 2019

(54) POSITIVE ELECTRODE FOR SECONDARY BATTERY, METHOD OF PREPARING THE SAME, AND LITHIUM SECONDARY BATTERY INCLUDING THE POSITIVE ELECTRODE

(71) Applicant: LG Chem, Ltd., Seoul (KR)

(72) Inventors: Young Geun Choi, Daejeon (KR); Kang Kun Kim, Daejeon (KR); Song Taek Oh, Daejeon (KR); Joo Young Choi, Daejeon (KR); Ji Hye Yang, Daejeon (KR)

(73) Assignee: LG Chem, Ltd. (KR)

( * ) Notice: Subject to any disclaimer, the term of this patent is extended or adjusted under 35 U.S.C. 154(b) by 133 days.

(21) Appl. No.: 15/885,961

(22) Filed: Feb. 1, 2018

(65) Prior Publication Data

US 2018/0159126 A1 Jun. 7, 2018

Related U.S. Application Data

(63) Continuation-in-part of application No. PCT/KR2016/012273, filed on Oct. 28, 2016.

(30) Foreign Application Priority Data

Oct. 30, 2015 (KR) .................... 10-2015-0151483
Oct. 27, 2016 (KR) .................... 10-2016-0141349

(51) Int. Cl.
*H01M 4/505* (2010.01)
*H01M 10/052* (2010.01)
(Continued)

(52) U.S. Cl.
CPC ......... *H01M 4/505* (2013.01); *H01M 4/0404* (2013.01); *H01M 4/0435* (2013.01); *H01M 4/131* (2013.01); *H01M 4/1391* (2013.01);
*H01M 4/525* (2013.01); *H01M 4/583* (2013.01); *H01M 4/624* (2013.01);
(Continued)

(58) Field of Classification Search
CPC .. H01M 4/505; H01M 4/0404; H01M 4/0435; H01M 4/131; H01M 4/1391; H01M 4/525; H01M 4/583; H01M 4/624; H01M 10/052; H01M 10/0569
See application file for complete search history.

(56) References Cited

U.S. PATENT DOCUMENTS 9,184,442 B2 11/2015 Nagai et al.
2011/0206985 A1 8/2011 Ishihara et al.
(Continued)

FOREIGN PATENT DOCUMENTS

EP 2639862 A1 9/2013
JP 2007109636 A 4/2007
(Continued)

OTHER PUBLICATIONS

EESR for Application No. 16860292.8 dated Jul. 16, 2018.
Search report from International Application No. PCT/KR2016/012273, dated Feb. 7, 2017.

*Primary Examiner* — Helen Oi K Conley
(74) *Attorney, Agent, or Firm* — Lerner, David, Littenberg, Krumholz & Mentlik, LLP

(57) ABSTRACT

The present invention relates to a positive electrode for a secondary battery in which a maximum diameter of internal pores is controlled to be less than 1 μm, a method of preparing the same, and a secondary battery including the positive electrode.

16 Claims, 4 Drawing Sheets

(51) Int. Cl.
*H01M 4/131* (2010.01)
*H01M 4/525* (2010.01)
*H01M 4/62* (2006.01)
*H01M 10/0569* (2010.01)
*H01M 4/04* (2006.01)
*H01M 4/583* (2010.01)
*H01M 4/1391* (2010.01)
*H01M 4/02* (2006.01)

(52) U.S. Cl.
CPC ..... *H01M 10/052* (2013.01); *H01M 10/0569* (2013.01); *H01M 2004/021* (2013.01); *H01M 2004/027* (2013.01); *H01M 2004/028* (2013.01); *H01M 2300/0037* (2013.01)

(56) References Cited

U.S. PATENT DOCUMENTS

| | | |
|---|---|---|
| 2012/0070709 A1 | 3/2012 | Goto et al. |
| 2012/0219855 A1 | 8/2012 | Ozaki et al. |
| 2012/0288759 A1 | 11/2012 | Nagai et al. |
| 2012/0295157 A1 | 11/2012 | Nagai et al. |
| 2013/0288121 A1 | 10/2013 | Nagai et al. |
| 2013/0295456 A1 | 11/2013 | Nagai et al. |

FOREIGN PATENT DOCUMENTS

| | | |
|---|---|---|
| JP | 2010015904 A | 1/2010 |
| KR | 20120023849 A | 3/2012 |
| KR | 20130087038 A | 8/2013 |
| KR | 20150016339 A | 2/2015 |
| KR | 20150016581 A | 2/2015 |
| WO | 2012063369 A1 | 5/2012 |
| WO | 2012110404 A1 | 8/2012 |

POSITIVE ELECTRODE FOR SECONDARY BATTERY, METHOD OF PREPARING THE SAME, AND LITHIUM SECONDARY BATTERY INCLUDING THE POSITIVE ELECTRODE

CROSS-REFERENCE TO RELATED APPLICATIONS

This application is a continuation-in-part of International Application No. PCT/KR2016/012273 filed on Oct. 28, 2016, which claims the benefit of Korean Patent Application Nos. 10-2015-0151483, filed on Oct. 30, 2015, and 10-2016-0141349, filed on Oct. 27, 2016, the disclosures of which are incorporated herein by reference.

TECHNICAL FIELD

The present invention relates to a positive electrode for a secondary battery, in which a size of pores in a positive electrode material mixture layer is controlled to improve output, a method of preparing the same, and a lithium secondary battery having improved output by including the positive electrode.

BACKGROUND ART

Demand for secondary batteries as an energy source has been significantly increased as technology development and demand with respect to mobile devices have increased. Among these secondary batteries, lithium secondary batteries having high energy density and operating potential, long cycle life, and low self-discharging rate have been commercialized and widely used.

A lithium secondary battery has a structure in which an electrode assembly, in which a positive electrode including a lithium transition metal oxide as an electrode active material, a negative electrode including a carbon-based active material, and a porous separator are sequentially stacked, is impregnated with an electrolyte.

The positive electrode is prepared by coating an aluminum foil with a positive electrode material mixture including the lithium transition metal oxide, and the negative electrode is prepared by coating a copper foil with a negative electrode material mixture including the carbon-based active material.

A conductive agent is added to the positive electrode material mixture and the negative electrode material mixture to improve electrical conductivity of the active materials. In particular, since the lithium transition metal oxide used as the positive electrode active material essentially has low electrical conductivity, the conductive agent is essentially added to the positive electrode material mixture.

However, it is difficult to expect uniform mixing of the active material and the conductive agent due to a difference in particle diameters of the active material and the conductive agent. Thus, a large amount of pores having a diameter of a few μm may be formed in the electrode, because agglomeration of conductive agent particles occurs or segregation of particles occurs due to a difference in particle sizes of the active material and the conductive agent.

Since these pores cause an increase in resistance or a decrease in output of the battery, there is a need to develop a method which may improve these issues.

PRIOR ART DOCUMENT

Korean Patent Application Laid-open Publication No. 2015-0016339

Korean Patent Application Laid-open Publication No. 2015-0016581

DISCLOSURE OF THE INVENTION

Technical Problem

An aspect of the present invention provides a positive electrode for a secondary battery in which a maximum diameter of internal pores is controlled to be less than 1 μm.

Another aspect of the present invention provides a method of preparing the positive electrode.

Another aspect of the present invention provides a lithium secondary battery having improved room temperature and low temperature outputs by including the positive electrode.

Technical Solution

According to an aspect of the present invention, there is provided a positive electrode for a secondary battery including:

a positive electrode collector; and a positive electrode material mixture layer coated on at least one side of the positive electrode collector, wherein the positive electrode material mixture layer includes a positive electrode active material, a conductive agent, a binder, and bimodal pores composed of first pores and second pores which have different maximum diameters, and the conductive agent and the positive electrode active material are included at a volume ratio ($K_1$) of 0.08:1 to 0.32:1, wherein a volume ratio of the conductive agent to the total pores is in a range of 0.1:1 to 0.33:1, a porosity is in a range of 30 vol % to 45 vol %, the maximum diameters of the first pores and the second pores are less than 1 μm, and an average diameter ratio (k) of the first pores to the second pores is in a range of 0.13:1 to 0.27:1.

According to another aspect of the present invention, there is provided a method of preparing a positive electrode for a secondary battery including:

preparing a positive electrode active material slurry having a solid content of 60 wt % to 90 wt % by mixing a conductive agent with a positive electrode active material at a volume ratio of 0.08:1 to 0.32:1;

preparing a positive electrode including a positive electrode material mixture layer having a porosity of 55 vol % to 65 vol % by coating a positive electrode collector with the positive electrode active material slurry and drying the coated positive electrode collector;

performing primary rolling of the positive electrode to prepare a positive electrode including a positive electrode material mixture layer having a porosity of 53 vol % to 57 vol %;

performing secondary rolling of the positive electrode prepared after the primary rolling to prepare a positive electrode including a positive electrode material mixture layer having a porosity of 30 vol % to 45 vol %; and performing tertiary rolling of the positive electrode prepared after the secondary rolling to prepare a positive electrode including a positive electrode material mixture layer having a porosity of 30 vol % to 45 vol %.

In this case, the positive electrode active material slurry may be coated with a loading amount of 2 mg/cm² to 15 mg/cm².

Also, the method of preparing a positive electrode may further include allowing the positive electrode prepared after the primary rolling to be left standing for 30 minutes to 2 hours before the secondary rolling. Furthermore, the method may further include allowing the positive electrode prepared after the secondary rolling to be left standing for 30 minutes to 2 hours before the tertiary rolling.

In this case, the primary rolling may be performed under conditions in which a gap between two top rolls and a bottom roll at room temperature is (total thickness of the positive electrode before the primary rolling+total thickness of the positive electrode prepared after the tertiary rolling)/2.

Also, the secondary rolling and the tertiary rolling are performed under conditions in which a gap between two top rolls and a bottom roll at room temperature is the same as a total thickness of the positive electrode targeted after the tertiary rolling.

According to another aspect of the present invention, there is provided a lithium secondary battery including:

a positive electrode, a negative electrode, a separator disposed between the positive electrode and the negative electrode, and a non-aqueous electrolyte solution including a lithium salt, wherein the positive electrode includes the positive electrode for a secondary battery of the present invention.

Advantageous Effects

According to the present invention, a lithium secondary battery having improved room temperature/low temperature outputs may be prepared by providing a positive electrode for a lithium secondary battery in which a maximum diameter of internal pores is controlled to be less than 1 μm.

MODE FOR CARRYING OUT THE INVENTION

Figure 1:
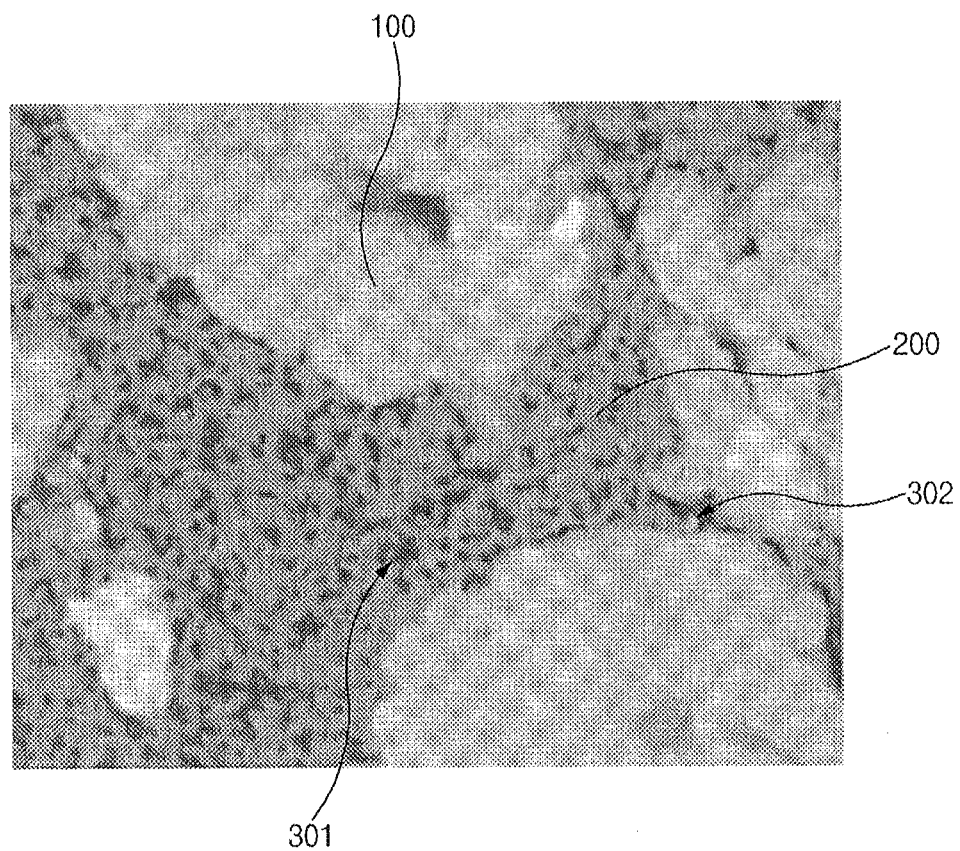
FIG. 1 is a scanning electron microscope image illustrating a cross-sectional structure of a positive electrode prepared according to Example 1 of the present invention.

Hereinafter, the present invention will be described in more detail.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

In order to achieve the object of the invention, the present invention provides a positive electrode for a secondary battery, in which a maximum diameter of internal pores is controlled to be less than 1 μm, and a method of preparing the same.

Also, the present invention provides a lithium secondary battery having improved room temperature and low temperature outputs by including the positive electrode.

Specifically, an embodiment of the present invention provides a positive electrode for a secondary battery includes:

a positive electrode collector, and a positive electrode material mixture layer coated on at least one side of the positive electrode collector, wherein the positive electrode material mixture layer includes a positive electrode active material, a conductive agent, a binder, and bimodal pores composed of first pores and second pores which have different maximum diameters, and the conductive agent and the positive electrode active material are included at a volume ratio ($K_1$) of 0.08:1 to 0.32:1, wherein a volume ratio of the conductive agent to the total pores is in a range of 0.1:1 to 0.33:1, a porosity is in a range of 30 vol % to 45 vol %, the maximum diameters of the first pores and the second pores are less than 1 μm, and an average diameter ratio (k) of the first pores to the second pores is in a range of 0.13:1 to 0.27:1.

First, in the positive electrode of the present invention, the positive electrode collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used.

The collector having a thickness of 3 μm to 500 μm, particularly, 3 μm to 100 μm may be used, and, in the present invention, it is desirable to use the collector having a thickness of 5 μm to 20 μm. Microscopic irregularities may be formed on the surface of the collector to improve the adhesion of the positive electrode active material. The positive electrode collector, for example, may be used in various shapes such as that of a film, a sheet, a foil, a net, a porous body, a foam body, a non-woven fabric body, and the like.

In the positive electrode of the present invention, the positive electrode active material is not particularly limited as long as it is formed of a transition metal compound capable of intercalating and deintercalating lithium, and, as a representative example, the positive electrode active material having an average particle diameter ($D_{50}$) of 3 μm to 20 μm used in the positive electrode according to the embodiment of the present invention may typically include a lithium composite metal oxide, as lithium transition metal oxide particles capable of intercalating and deintercalating lithium ions, wherein the lithium composite metal oxide may include lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-x}Mn_xO_2$ (where 0<x<1), $LiMn_{2-y}Ni_yO_4$ (where 0<y<2), etc.), lithium-nickel-cobalt-based oxide (e.g., $LiNi_{1-z}Co_zO_2$ (where 0<z<1), etc), lithium-manganese-cobalt-based oxide (e.g., $LiCo_{1-a}Mn_aO_2$ (where 0<a<1), $LiMn_{2-b}Co_bO_4$ (where 0<b<2), etc.), lithium-nickel-manganese-cobalt-based oxide (e.g., $Li(Ni_pCo_qMn_r)O_2$ (where 0<p<1, 0<q<1, 0<r<1, and p+q+r=1) or $Li(Ni_cCo_dMn_e)O_4$ (where 0<c<2, 0<d<2, 0<e<2, and c+d+e=2), etc.), or lithium-nickel-cobalt-transition metal (M) oxide (e.g., Li(Ni$_f$Co$_g$Mn$_h$M$_i$)O$_2$ (where M is selected from the group consisting of aluminum (Al), iron (Fe), vanadium (V), chromium (Cr), titanium (Ti), tantalum (Ta), magnesium (Mg), and molybdenum (Mo), and f, g, h, and i are atomic fractions of each independent elements, wherein 0<f<1, 0<g<1, 0<h<1, 0<i<1, and f+g+h+i=1), etc.), and any one thereof or a compound of two or more thereof may be included. Among these materials, in terms of the improvement of the capacity characteristics and stability of the battery, the lithium composite metal oxide may include LiCoO$_2$, LiMnO$_2$, lithium nickel manganese cobalt oxide (e.g., Li(Ni$_{0.6}$Mn$_{0.2}$Co$_{0.2}$)O$_2$, Li(Ni$_{0.5}$Mn$_{0.3}$Co$_{0.2}$)O$_2$, Li(Ni$_{0.7}$Mn$_{0.15}$Co$_{0.15}$) or Li(Ni$_{0.8}$Mn$_{0.1}$Co$_{0.1}$)O$_2$), or lithium nickel cobalt aluminum oxide (e.g., LiNi$_{0.8}$Co$_{0.15}$Al$_{0.05}$O$_2$, etc.). In consideration of a significant improvement due to the control of type and content ratio of elements constituting the lithium composite metal oxide, the lithium composite metal oxide may include Li(Ni$_{0.6}$Mn$_{0.2}$Co$_{0.2}$)O$_2$, Li(Ni$_{0.5}$Mn$_{0.3}$Co$_{0.2}$)O$_2$, Li(Ni$_{0.7}$Mn$_{0.15}$Co$_{0.15}$)O$_2$, or Li(Ni$_{0.8}$Mn$_{0.1}$Co$_{0.1}$)O$_2$, and any one thereof or a mixture of two or more thereof may be used.

The positive electrode active material may be included in an amount of 80 wt % to 98 wt % based on a total weight of the positive electrode material mixture layer.

In the positive electrode of the present invention, any conductive agent may be used without particular limitation so long as it has suitable conductivity without causing adverse chemical changes in the battery, and, as a representative example, the conductive agent has an average particle diameter (D$_{50}$) of 5 nm to 30,000 nm, and may include a single material selected from the group consisting of artificial graphite, natural graphite, carbon black, acetylene black, Ketjen black, channel black, furnace black, lamp black, thermal black, conductive fibers, fluorocarbon, aluminum, nickel powder, conductive whiskers, conductive metal oxide, and polyphenylene derivatives, or a mixture of two or more thereof.

Also, the conductive agent and the positive electrode active material may be included at a volume ratio (K$_1$) of 0.08:1 to 0.32:1, a volume ratio of the conductive agent to the total pores including the first and second pores is in a range of 0.1:1 to 0.33:1, and, in this case, a porosity is in a range of 30 vol % to 45 vol %.

In this case, the volume ratio of the conductive agent:the positive electrode active material and the volume ratio of the conductive agent:the total pores in the positive electrode may be calculated by the following process.

First, in the prepared positive electrode, a total volume (Vt), as a sum of a pore volume and a solid content including the active material, binder, and conductive agent, is obtained by multiplying an area, width×length (5×5 cm$^2$), of the positive electrode material mixture layer by a thickness of the positive electrode material mixture layer.

Subsequently, a volume (Vp) of the total pores may be calculated by the following Equation 1.

$$Vp = Vt \times \text{porosity (\%)} \quad [\text{Equation 1}]$$

Also, a value obtained by subtracting the volume (Vp) of the total pores from the total volume becomes a volume of the solid content (Vs=Vt−Vp).

Furthermore, a volume of each component may be obtained by dividing each mass of the active material (Va.m.), conductive agent (Vcon), and binder (Vbin) used in the area, the width×the length (5×5 cm$^2$), by each true density.

Also, a measurement method of porosity in the positive electrode and pore size is not particularly limited, but the size (micro) and meso pore volume may be measured by using a commonly used Brunauer-Emmett-Teller (BET) measurement method using absorbing gas such as nitrogen, or may be measured by using commonly used mercury porosimetry.

In a case in which the volume ratio (K$_1$) of the conductive agent to the positive electrode active material is less than 0.08, or the volume ratio of the conductive agent to the total pores is less than 0.1, that is, an amount of the conductive agent is small (porosity is greater than 45 vol %), the amount of the conductive agent, which may fill a gap between the active material particles, is not sufficient so that the conductive agent may not sufficiently surround the active material. As a result, since the sizes of the first pores and the second pores are increased, electrons generated by a reaction on a surface of the active material may not only not be easily transferred, but also a conductive network may not be smoothly connected in the positive electrode to increase electrical resistance in the electrode. In contrast, in a case in which the volume ratio (K$_1$) of the conductive agent to the positive electrode active material is greater than 0.32, or the volume ratio of the conductive agent to the total pores is greater than 0.33 (porosity is 30 vol % or less), since an excessive amount of the conductive agent is present on the surface of the active material, the resistance is increased due to a decrease in the size of the first pores to reduce a reaction area of the positive electrode active material and an electrolyte solution, and thus, battery output may be reduced.

Figure 2:
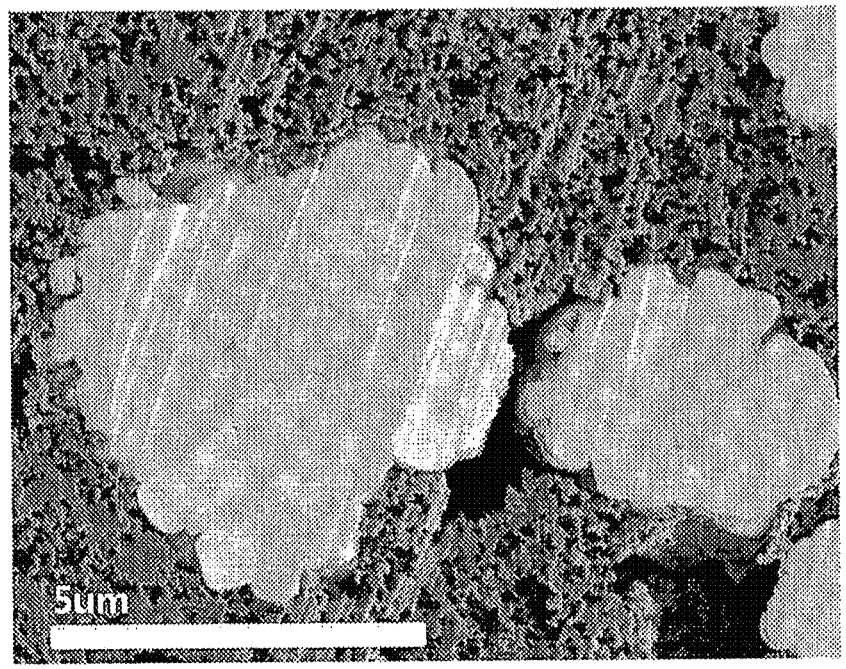
FIG. 2 is a scanning electron microscope image illustrating a cross-sectional structure of a positive electrode prepared according to Comparative Example 3.
Figure 3:
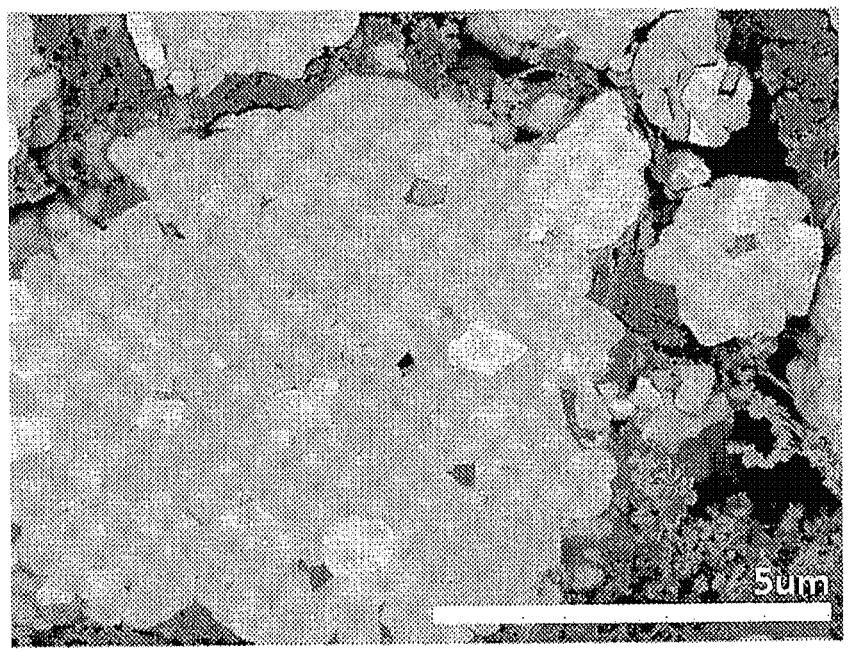
FIG. 3 is a scanning electron microscope image illustrating a cross-sectional structure of a positive electrode prepared according to Comparative Example 4.

Specifically, as illustrated in FIG. 2, in a case in which the volume ratio of the conductive agent/the positive electrode active material is less than 0.08 and the volume ratio of the conductive agent/the total pores is less than 0.1, that is, the conductive agent is included in an amount smaller than that of the pores, it may be confirmed that pluralities of the first pores and second pores having a diameter of 1 μm or more are formed. Also, as illustrated in FIG. 3, in a case in which the volume ratio of the conductive agent/the positive electrode active material is greater than 0.32 and the volume ratio of the conductive agent/the total pores is greater than 0.33, since a phenomenon occurs in which the conductive agent is agglomerated with each other due to the excessive use of the conductive agent and does not sufficiently cover the surface of the active material, the second pores having a diameter of 1 μm or more may be formed.

In contrast, as illustrated in FIG. 1, with respect to the positive electrode of the present invention which includes the conductive agent and the positive electrode active material at a volume ratio (K$_1$) of 0.08:1 to 0.32:1 and includes the conductive agent and the total pores at a volume ratio of 0.1:1 to 0.33:1, maximum diameters of first pores 301 and second pores 302 may be respectively controlled to be less than 1 μm, particularly, a level of a few hundreds nm.

Thus, the achievement of less than 1 μm of the maximum diameters of the first pores 301 and the second pores 302 in the positive electrode of the present invention is possible only for a case satisfying all conditions that the volume ratio of conductive agent 200/positive electrode active material 100 is in a range of 0.08 to 0.32, the volume ratio of the conductive agent/the total pores is in a range of 0.1 to 0.33, and the porosity is in a range of 30 vol % to 45 vol % (see FIG. 1).

In this case, the first pores include pores between the conductive agent-the conductive agent which are formed by being surrounded by adjacent conductive agent particles, and the second pores include pores between the conductive agent-the active material which are formed by being surrounded by the adjacent conductive agent and positive electrode active material.

Outer surfaces of the first and second pores may be respectively formed nonlinearly along surfaces of pluralities of adjacent conductive agent and positive electrode active material particles.

As described above, the maximum diameters of the first pores and the second pores are less than 1 μm, an average diameter of the first pores is in a range of 1 nm to 100 nm, and an average diameter of the second pores is in a range of 100 nm to 500 nm, particularly, 200 nm to 400 nm. In this case, the average diameter ratio (k) of the first pores to the second pores may be in a range of 0.13:1 to 0.27:1.

If the average diameter ratio (k) of the first pores to the second pores is less than 0.13, it means that the size of the first pores is very small due to the agglomeration of the conductive agent particles, or the size of the second pores between the conductive agent particles and the active material particles is relatively very large. In a case in which the first pores are small, Li ions in the electrolyte solution may be difficult to smoothly move to the surface of the active material due to conductive agent-conductive agent clusters, and, in a case in which the second pores are large, since a contact between the active material and the conductive agent is difficult, it may be difficult to transfer the electrons generated by the reaction occurring on the surface of the active material.

In contrast, if the average diameter ratio (k) of the first pores to the second pores is greater than 0.27, since a contact between the conductive agent-the conductive agent is not smooth due to a large size of the first pores, the electrical resistance in the electrode may be increased, or, since the reaction area of the active material surface and the electrolyte solution is reduced due to a relatively small size of the second pores, the output may be reduced.

A measurement method of the diameters of the first pores and the second pores is not particularly limited, but the diameters were represented as magnitudes of two main peaks obtained by using Hg porosimeter commonly used in the art, and a position corresponding to the magnitude indicated by each peak was identified by an electron microscope (SEM) image.

In the positive electrode of the present invention, the binder is a component that assists in the binding between the conductive agent and the active material and the binding between the active material and the current collector, wherein representative examples of the binder may be polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, an ethylene-propylene-diene terpolymer (EPDM), a sulfonated EPDM, a styrene-butadiene rubber, a fluoro rubber, various copolymers, and the like.

The binder may be included in an amount of about 1 wt % to about 10 wt %, particularly, 2 wt % to 9 wt %, based on a total weight of a positive electrode material mixture, wherein, in a case in which the binder is included in an amount greater than 10 wt %, since the amount of the positive electrode active material is relatively reduced, capacity may be reduced, and, in a case in which the binder is included in an amount less than 1 wt %, since the electrode is exfoliated, life performance of the battery may be degraded.

The positive electrode of the present invention may have an energy per unit area of 0.8 mAh/cm$^2$ to 1.8 mAh/cm$^2$.

Also, according to an embodiment of the present invention, provided is a method of preparing a positive electrode for a secondary battery including the steps of:

preparing a positive electrode active material slurry having a solid content of 60 wt % to 90 wt % by mixing a conductive agent with a positive electrode active material at a volume ratio of 0.08:1 to 0.32:1;

preparing a positive electrode including a positive electrode material mixture layer having a porosity of 50 vol % to 60 vol % by coating a positive electrode collector with the positive electrode active material slurry and drying the coated positive electrode collector;

performing primary rolling of the positive electrode to prepare a positive electrode including a positive electrode material mixture layer having a porosity of 53 vol % to 57 vol %;

performing secondary rolling of the positive electrode prepared after the primary rolling to prepare a positive electrode including a positive electrode material mixture layer having a porosity of 30 vol % to 45 vol %; and performing tertiary rolling of the positive electrode prepared after the secondary rolling to prepare a positive electrode including a positive electrode material mixture layer having a porosity of 30 vol % to 45 vol %.

In the method of the present invention, the preparing of the positive electrode active material slurry may be performed by preparing a binder solution by dissolving a binder in an organic solvent, subsequently adding a conductive agent to prepare a conductive agent-binder mixed solution, and then adding a positive electrode active material while stirring the mixed solution.

In this case, the conductive agent-binder mixed solution may be prepared by stirring at a rate of about 1,000 rpm to about 2,000 rpm, particularly, 1,500 rpm for about 1 minute to about 10 minutes at room temperature.

Also, after further adding an active material and, if necessary, an organic solvent to the mixed solution, a positive electrode active material slurry may be prepared while stirring at a rate of about 1,000 rpm to about 2,000 rpm, particularly, 1,500 rpm for 5 minutes to 30 minutes at room temperature.

In the method of the present invention, in a case in which the volume ratio ($K_1$) of the conductive agent/the positive electrode active material is less than 0.08, that is, the amount of the conductive agent is small, since the amount of the conductive agent, which may fill the gap between the active material particles, is not sufficient, the conductive agent may not sufficiently surround the active material, and thus, the electrons generated by the reaction on the surface of the active material may not only not be easily transferred due to increases in the sizes of the first pores and the second pores, but also the conductive network may not be smoothly connected due to lack of the conductive material in the electrode to increase the electrical resistance.

In contrast, in a case in which the volume ratio of the conductive agent/the positive electrode active material is greater than 0.32, since the excessive amount of the conductive agent is present on the surface of the active material, the sizes of the first pores and the second pores are relatively reduced to reduce the reaction area of the active material surface and an electrolyte solution, and thus, the battery output may be reduced.

Furthermore, the solid content in the positive electrode active material slurry may be in a range of 60 wt % to 90 wt %, and desired porosity may be achieved when the solid content is within the above range. In this case, the solid content denotes the conductive agent and the positive electrode active material.

In the method of the present invention, the positive electrode active material slurry may be coated with a loading amount of 2 mg/cm$^2$ to 15 mg/cm$^2$. In this case, as a method of coating the active material slurry, a coating method commonly used in the art may be used without limitation, and non-limiting examples thereof may include various methods such as dip coating, die coating, roll coating, comma coating, or a mixed method thereof.

After the positive electrode active material slurry coating, the drying may be performed in a temperature range of room temperature to 300° C. for 1 hour to 24 hours. In a case in which the drying temperature is lower than the room temperature, the solvent may not be dried, and, in a case in which the drying temperature is greater than 300° C., since it corresponds to a heat treatment process, it is not meaningful as a drying process. In a case in which the drying time is less than 1 hour, the solvent may not be dried, and, in a case in which the drying time is greater than 24 hours, it is not desirable because process time is excessively increased.

Also, in the present invention, the primary rolling may be performed under conditions in which a gap between two top rolls and a bottom roll at room temperature is (total thickness of the positive electrode before the primary rolling+total thickness of the positive electrode targeted after the tertiary rolling)/2.

An effect of more uniformly forming the size of the second pores may be obtained by the primary rolling.

Furthermore, the secondary and tertiary rolling may be performed under conditions in which a gap between two top rolls and a bottom roll at room temperature is the same as the total thickness of the positive electrode targeted after the tertiary rolling.

In this case, the positive electrode material mixture layer after the secondary rolling may be formed to have a thickness greater than a target thickness, because the thickness is partially recovered due to elasticity after a certain period of time. Thus, in the present invention, a positive electrode including a positive electrode material mixture layer, in which the target thickness may be maintained, may be prepared by performing rolling once more (tertiary rolling). In addition, it may be controlled such that the porosity in the positive electrode is in a range of 30 vol % to 45 vol %, the volume ratio of the conductive agent to the total pores including the first pores and the second pores is in a range of 0.1:1 to 0.33:1, and the maximum diameters of the first pores and the second pores are less than 1 μm.

As a result, in the present invention, since the positive electrode, in which the maximum diameters of the bimodal first pores and second pores are controlled to be less than 1 μm, is provided, the electrolyte solution may be sufficiently contained in the electrode to improve the contact effect of the positive electrode active material and the electrolyte solution as much as possible (capillary force), and thus, packing density of the electrode may be improved while reducing internal resistance of an electrode plate. Thus, since excellent high-rate charge and discharge characteristics and life characteristics may be secured due to the increases in electrical conductivity and adhesion in comparison to a typical positive electrode prepared without consideration of the size of pores, a secondary battery having improved room temperature and low temperature outputs may be realized in a short period of time.

Also, the method may further include allowing the positive electrode prepared after the primary rolling to be left standing for 30 minutes to 2 hours before the secondary rolling.

Furthermore, the method may further include allowing the positive electrode prepared after the secondary rolling to be left standing for 30 minutes to 2 hours before the tertiary rolling.

Also, an embodiment of the present invention provides a secondary battery including:

a positive electrode, a negative electrode, a separator disposed between the positive electrode and the negative electrode, and a non-aqueous electrolyte solution, wherein the positive electrode includes the positive electrode of the present invention.

In this case, since the positive electrode has been described above, the detailed description thereof will be omitted.

At least one surface of a negative electrode collector is coated with a negative electrode active material slurry composition, and the negative electrode may then be prepared by drying and rolling the coated collector.

In this case, the negative electrode collector is not particularly limited so long as it has conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, similar to the positive electrode collector, the negative electrode collector having various shapes, such as a film, a sheet, a foil, a net, a porous body, a foam body, a non-woven fabric body, and the like, in which fine irregularities are formed on surfaces thereof, may be used.

The negative electrode active material slurry composition may include a negative electrode active material, a solvent, and, selectively, at least one of a binder and a conductive agent.

In this case, the negative electrode active material is a compound capable of reversibly intercalating and deintercalating lithium, wherein specific examples of the negative electrode active material may be a carbonaceous material such as artificial graphite, natural graphite, graphitized carbon fibers, and amorphous carbon; a metallic or semi-metallic compound alloyable with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide or semi-metal oxide which may be doped and undoped with lithium such as $SiO_{x1}$ (0<x1<2), $SnO_2$, vanadium oxide, and lithium vanadium oxide; or a composite including the inorganic compound and the carbonaceous material such as a Si—C composite or a Sn—C composite, and any one thereof or a mixture of two or more thereof may be used. Also, a metallic lithium thin film may be used as the negative electrode active material. Furthermore, both low crystalline carbon and high crystalline carbon may be used as the carbon material. Typical examples of the low crystalline carbon may be soft carbon and hard carbon, and typical examples of the high crystalline carbon may be irregular, planar, flaky, spherical, or fibrous natural graphite or artificial graphite, Kish graphite, pyrolytic carbon, mesophase pitch-based carbon fibers, meso-carbon microbeads, mesophase pitches, and high-temperature sintered carbon such as petroleum or coal tar pitch derived cokes.

The negative electrode active material may be included in an amount of 80 wt % to 99 wt % based on a total weight of the negative electrode active material slurry composition.

The binder is a component that assists in the binding between the conductive agent, the active material, and the current collector, wherein the binder is commonly added in an amount of 1 wt % to 30 wt % based on the total weight of the negative electrode active material slurry. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene terpolymer (EPDM), a sulfonated EPDM, a styrene-butadiene rubber, a fluoro rubber, and various copolymers thereof.

The conductive agent is a component for further improving the conductivity of the negative electrode active material, wherein the conductive agent may be added in an amount of 1 wt % to 20 wt % based on the total weight of the negative electrode active material slurry. Any conductive agent may be used without particular limitation so long as it has suitable conductivity without causing adverse chemical changes in the battery, and, for example, a conductive material such as: graphite such as natural graphite or artificial graphite; carbon black such as acetylene black, Ketjen black, channel black, furnace black, lamp black, and thermal black; conductive fibers such as carbon fibers and metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives may be used.

The solvent may include water or an organic solvent, such as N-methyl-2-pyrrolidone (NMP), and may be used in an amount such that desirable viscosity is obtained when the negative electrode active material as well as selectively the binder and the conductive agent are included. For example, the solvent may be included so that a concentration of solid content including the negative electrode active material as well as selectively the binder and the conductive agent is in a range of 50 wt % to 95 wt %, for example, 70 wt % to 90 wt %.

A typical porous polymer film used as a typical separator, for example, a porous polymer film prepared from a polyolefin-based polymer, such as an ethylene homopolymer, a propylene homopolymer, an ethylene-butene copolymer, an ethylene-hexene copolymer, and an ethylene-methacrylate copolymer, may be used alone or in a lamination therewith as the separator. Also, a typical porous nonwoven fabric, for example, a nonwoven fabric formed of high melting point glass fibers or polyethylene terephthalate fibers may be used, but the present invention is not limited thereto.

Also, the non-aqueous electrolyte solution is composed of an electrolyte solution and a lithium salt, and a non-aqueous organic solvent or an organic solid electrolyte is used as the electrolyte solution.

Examples of the non-aqueous organic solvent may include aprotic organic solvents, such as N-methyl-2-pyrrolidone, propylene carbonate, ethylene carbonate, butylene carbonate, dimethyl carbonate, diethyl carbonate, γ-butyrolactone, 1,2-dimethoxy ethane, 2-methyl tetrahydrofuran, dimethyl sulfoxide, 1,3-dioxolane, formamide, diemthylformamide, dioxolane, acetonitrile, nitromethane, methyl formate, methyl acetate, phosphate triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, and ethyl propionate.

Examples of the organic solid electrolyte may include a polyethylene derivative, a polyethylene oxide derivative, a polypropylene oxide derivative, a phosphate ester polymer, poly agitation lysine, polyester sulfide, polyvinyl alcohol, polyvinylidene fluoride, and a polymer containing an ionic dissociation group.

The lithium salt may be used without limitation so long as it is typically used in an electrolyte for a lithium secondary battery, and, for example, may include a $Li^+$ cation and any one anion selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $N(CF_3SO_2)_2^-$, $N(SO_2F)_2^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $N(CF_3CF_2SO_2)_2^-$.

Also, in order to improve charge/discharge characteristics and flame retardancy, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, and aluminum trichloride, for example, may be added to the electrolyte solution. In some cases, halogen-containing solvents, such as carbon tetrachloride and ethylene trifluoride, may be further included in order to impart incombustibility, and carbon dioxide gas may be further included in order to improve high-temperature storage characteristics.

Hereinafter, the present invention will be described in more detail according to examples. However, the invention may be embodied in many different forms and should not be construed as being limited to the embodiments set forth herein. Rather, these example embodiments are provided so that this description will be thorough and complete, and will fully convey the scope of the present invention to those skilled in the art.

EXAMPLES

Example 1

(1) Positive Electrode Preparation

A binder solution was prepared by dissolving a binder (polyvinylidene fluoride, 10 wt %) in a N-methyl-2-pyrrolidone (NMP) solvent, and the binder solution and an acetylene black conductive agent (super C65, average particle diameter ($D_{50}$) of 30 nm) were then mixed and stirred at 1,500 rpm for 3 minutes in a planetary mixer.

Subsequently, $Li(Ni_{0.6}Mn_{0.2}Co_{0.2})O_2$ positive electrode active material particles having an average particle diameter ($D_{50}$) of 5 μm were added to the mixed solution such that a volume ratio of the conductive agent:the positive electrode active material became 0.19:1, and mixed at 1,500 rpm for 5 minutes to prepare a positive electrode active material slurry (solid content of 80 wt %).

A 15 μm thick aluminum foil was coated with the prepared positive electrode active material slurry to a level of 6.3 mg/cm² using a comma coater and hot air dried to prepare a positive electrode (total thickness of 107 μm and thickness of positive electrode material mixture layer of 92 μm) including a first positive electrode material mixture layer having a porosity of 65 vol %.

A roll press machine equipped with two top rolls and bottom roll (DLC-CLPCA-2020, CIS Co. Ltd.) was prepared, wherein a gap between the two top rolls and the bottom roll was set to be 85 μm.

The aluminum foil, on which the first positive electrode material mixture layer was formed, was subjected to primary rolling, while being passed through between the two top rolls and the bottom roll at room temperature, to prepare a positive electrode (total thickness of 85 μm and thickness of positive electrode material mixture layer of 77 μm) including a positive electrode material mixture layer having a porosity of 55 vol %.

The positive electrode prepared after the primary rolling was left standing for 1 hour.

Next, after setting the gap between the top roll and the bottom roll to be 67 μm, the positive electrode prepared after the primary rolling was subjected to secondary rolling, while being passed through the gap, to prepare a positive electrode (total thickness of 67 μm and thickness of positive electrode material mixture layer of 52 μm) including a positive electrode material mixture layer having a porosity of 40 vol %.

Subsequently, the positive electrode prepared after the secondary rolling was left standing for 1 hour.

Next, tertiary rolling was performed at the same roll gap as that of the secondary rolling to prepare a positive electrode (total thickness of 67 μm and thickness of positive electrode material mixture layer of 52 μm) including a positive electrode material mixture layer having a porosity of 40 vol %.

A cross-section of the prepared positive electrode was observed with an electron microscope, and the results thereof are presented in FIG. 1. Referring to FIG. 1, it may be understood that the positive electrode of the present invention included positive electrode active material 100 and conductive agent 200 which had different sizes from each other, there was no pore between active material particles because the conductive agent was sufficiently distributed around the positive electrode active material, and the positive electrode included first pores 301 between conductive agent particles and second pores 302 between the conductive agent particles and the active material particles.

Also, a porosity of the positive electrode including the positive electrode material mixture layer was 40 vol %, a volume ratio of the conductive agent/the total pores was 0.22, a diameter of the first pores was 80 nm, a diameter of the second pores was 300 nm, and an average diameter ratio (k) of the first pores/the second pores was 0.27.

An energy density per unit area of the positive electrode of the present invention thus prepared was 1.5 mAh/cm$^2$.

In this case, the porosity in the positive electrode and the pore diameters were measured by using a mercury porosimeter (Micromeritics AUTOPORE V). The porosity measured by the method became a total volume of the pores.

Furthermore, masses of the positive electrode active material and the conductive agent used in an area, width× length (5×5 cm$^2$), of the prepared electrode were calculated, and a volume of each component may be calculated by respectively dividing the masses by each true density.

(2) Negative Electrode Preparation

A negative electrode active material (98 wt %), in which artificial graphite and natural graphite were mixed in a weight ratio of 5:5, CMC (1 wt %), and an SBR binder (2 wt %) were mixed to prepare a negative electrode material mixture, and water was then added thereto to prepare a negative electrode slurry. A copper current collector was coated with the negative electrode slurry, and the coated collector was then dried in a vacuum oven at 120° C. to prepare a negative electrode.

(3) Battery Preparation

A cylindrical type battery was prepared by injecting an electrolyte solution composed of a solution (1:2 vol %) of ethylene carbonate (EC) and ethyl methyl carbonate (EMC), in which 1M LiPF$_6$ was dissolved, between the positive electrode and the negative electrode.

Example 2

A positive electrode and a secondary battery including the same were prepared in the same manner as in Example 1 except that the conductive agent and the positive electrode active material were included in a volume ratio of 0.28:1 during the preparation of the positive electrode in Example 1.

In this case, a porosity of the positive electrode was 40 vol %, a volume ratio of the conductive agent/the total pores in the positive electrode was 0.31, a diameter of the first pores was 45 nm, a diameter of the second pores was 320 nm, and an average diameter ratio (k) of the first pores/the second pores was 0.14. An energy density per unit area of the positive electrode was 1.5 mAh/cm$^2$.

Example 3

A positive electrode and a secondary battery including the same were prepared in the same manner as in Example 1 except that the conductive agent and the positive electrode active material were included in a volume ratio of 0.08:1 during the preparation of the positive electrode in Example 1.

In this case, a porosity of the positive electrode was 40 vol %, a volume ratio of the conductive agent/the total pores in the positive electrode was 0.1, a diameter of the first pores was 80 nm, a diameter of the second pores was 300 nm, and an average diameter ratio (k) of the first pores/the second pores was 0.27. An energy density per unit area of the positive electrode was 1.5 mAh/cm$^2$.

Example 4

A positive electrode and a secondary battery including the same were prepared in the same manner as in Example 1 except that the conductive agent and the positive electrode active material were included in a volume ratio of 0.32:1 during the preparation of the positive electrode in Example 1.

In this case, a porosity of the positive electrode was 40 vol %, a volume ratio of the conductive agent/the total pores in the positive electrode was 0.33, a diameter of the first pores was 45 nm, a diameter of the second pores was 335 nm, and an average diameter ratio (k) of the first pores/the second pores was 0.13. An energy density per unit area of the positive electrode was 1.5 mAh/cm$^2$.

Comparative Example 1

A positive electrode and a secondary battery including the same were prepared in the same manner as in Example 1 except that the conductive agent and the positive electrode active material were included in a volume ratio of 0.051:1 during the preparation of the positive electrode in Example 1 and the positive electrode (total thickness of 60 μm) including a positive electrode material mixture layer was prepared by rolling once.

In this case, a volume ratio of the conductive agent/the total pores in the positive electrode was 0.07, a diameter of the first pores was 150 nm, a diameter of the second pores was 500 nm, and an average diameter ratio (k) of the first pores/the second pores was 0.3. An energy density per unit area of the positive electrode was 1.5 mAh/cm².

Comparative Example 2

A positive electrode and a secondary battery including the same were prepared in the same manner as in Example 1 except that the conductive agent and the positive electrode active material were included in a volume ratio of 0.45:1 during the preparation of the positive electrode in Example 1 and the positive electrode (total thickness of 89 μm) including a positive electrode material mixture layer was prepared by rolling twice.

In this case, a volume ratio of the conductive agent/the total pores in the positive electrode was 0.37, a diameter of the first pores was 30 nm, a diameter of the second pores was 1,000 nm, and an average diameter ratio (k) of the first pores/the second pores was 0.03.

Comparative Example 3

A positive electrode and a secondary battery including the same were prepared in the same manner as in Example 1 except that the conductive agent and the positive electrode active material were included in a volume ratio of 0.07:1 during the preparation of the positive electrode in Example 1.

A cross-section of the prepared positive electrode was observed with an electron microscope, and the results thereof are presented in FIG. 2. As illustrated in FIG. 2, it may be confirmed that, since the conductive agent did not sufficiently surround the active material, second pores having a diameter of a few μm were formed.

In this case, a volume ratio of the conductive agent/the total pores in the positive electrode was 0.09, a porosity was 40 vol %, a diameter of the first pores was 110 nm, a diameter of the second pores was 400 nm, and an average diameter ratio (k) of the first pores/the second pores was 0.28.

Comparative Example 4

A positive electrode and a secondary battery including the same were prepared in the same manner as in Example 1 except that the conductive agent and the positive electrode active material were included in a volume ratio of 0.34:1 during the preparation of the positive electrode in Example 1.

A cross-section of the prepared positive electrode was observed with an electron microscope, and the results thereof are presented in FIG. 3. As illustrated in FIG. 3, it may be confirmed that a diameter of the first pores was reduced, but a large number of the second pores having a diameter of 1 μm or more was formed.

In this case, a volume ratio of the conductive agent/the total pores in the positive electrode was 0.34, a porosity was 40 vol %, the diameter of the first pores was 40 nm, the diameter of the second pores was 400 nm, and an average diameter ratio (k) of the first pores/the second pores was 0.1. An energy density per unit area of the positive electrode was 1.5 mAh/cm².

Experimental Example

Experimental Example 1

Figure 4:
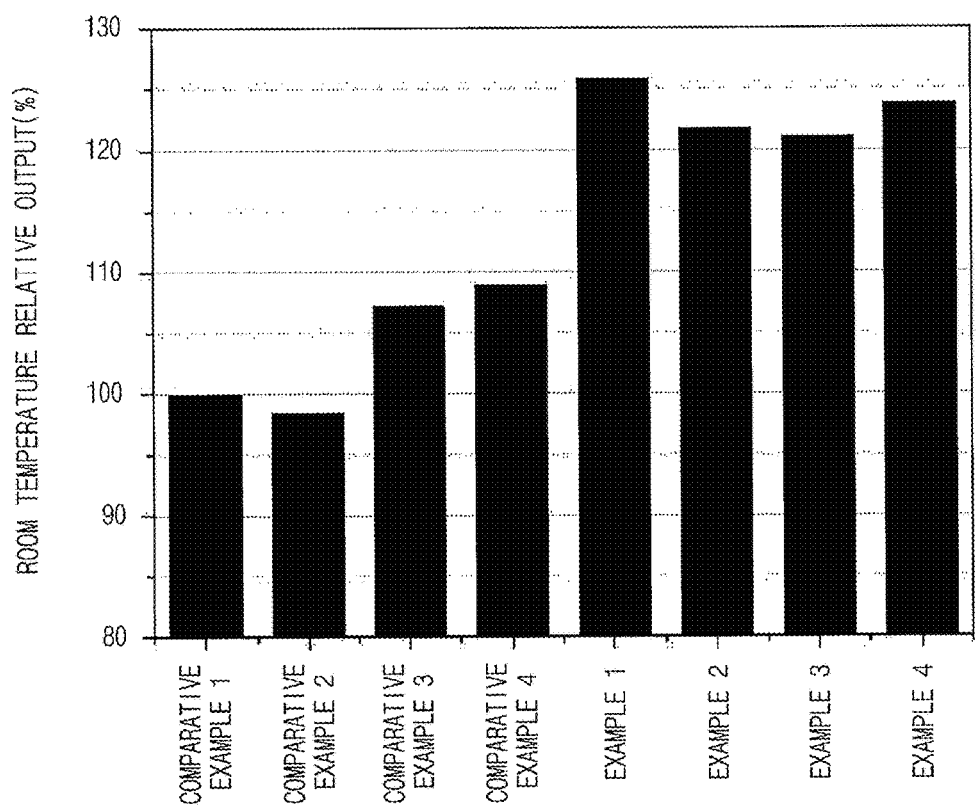
FIG. 4 is a graph comparing room temperature outputs of lithium secondary batteries according to Experimental Example 1 of the present invention.

The batteries obtained in Examples 1 to 4 and Comparative Examples 1 to 4 were subjected to formation at 4.2 V, a change in output at room temperature (25° C., 10 second resistance, @SOC 50%) was then measured at a state of charge (SOC) of 50%, and the results thereof are presented in FIG. 4.

Referring to FIG. 4, it may be confirmed that the secondary batteries using the positive electrodes of Examples to 4 had excellent output characteristics at room temperature in comparison to the batteries using the positive electrodes of Comparative Examples 1 to 4.

That is, in a case in which the volume ratio of the conductive agent/the positive electrode active material was less than 0.08, and the volume ratio of the conductive agent/the total pores was less than 0.1 (the average diameter ratio (k) of the first pores/the second pores was greater than 0.27) as in Comparative Examples 1 and 3, since the conductive agent around the active material was not sufficient, the output may be reduce due to an increase in electrical resistance in the electrode.

Also, in a case in which the volume ratio of the conductive agent/the positive electrode active material was greater than 0.32, and the volume ratio of the conductive agent/the total pores was greater than 0.33 (the average diameter ratio (k) of the first pores/the second pores was less than 0.13) as in Comparative Examples 2 and 4, since an excessive amount of the conductive agent was present on the surface of the active material, a reaction area of the active material surface and the electrolyte solution was reduced, and thus, the output may be reduce.

In this case, since the data shown in FIG. 4 are merely exemplary, detailed output values according to SOC may vary according to types of battery cell, but it may be predicted that there is no difference in output characteristics (tendencies).

The invention claimed is:

1. A positive electrode for a secondary battery, the positive electrode comprising:
    a positive electrode collector; and
    a positive electrode material mixture layer coated on at least one side of the positive electrode collector,
    wherein the positive electrode material mixture layer comprises a positive electrode active material, a conductive agent, a binder, and bimodal pores composed of first pores and second pores which have different average diameters, and
    the conductive agent and the positive electrode active material are included at a volume ratio ($K_1$) of 0.08:1 to 0.32:1,
    wherein a volume ratio of the conductive agent to the total pores is in a range of 0.1:1 to 0.33:1,
    a porosity is in a range of 30 vol % to 45 vol %,
    maximum diameters of the first pores and the second pores are less than 1 μm, and
    an average diameter ratio (k) of the first pores to the second pores is in a range of 0.13:1 to 0.27:1.

2. The positive electrode for a secondary battery of claim 1, wherein the positive electrode active material has an average particle diameter ($D_{50}$) of 3 μm to 20 μm.

3. The positive electrode for a secondary battery of claim 1, wherein the positive electrode active material comprises a single material selected from the group consisting of lithium-manganese-based oxide, lithium-cobalt-based oxide, lithium-nickel-based oxide, lithium-nickel-manganese-based oxide, lithium-nickel-cobalt-based oxide, lithium-manganese-cobalt-based oxide, lithium-nickel-manganese-cobalt-based oxide, and lithium-nickel-cobalt-transition metal oxide, or a mixture of two or more thereof.

4. The positive electrode for a secondary battery of claim 1, wherein the conductive agent has an average particle diameter ($D_{50}$) of 5 nm to 30,000 nm.

5. The positive electrode for a secondary battery of claim 1, wherein the conductive agent comprises a single material selected from the group consisting of natural graphite, artificial graphite, carbon black, acetylene black, Ketjen black, channel black, furnace black, lamp black, thermal black, conductive fibers, fluorocarbon, aluminum, nickel powder, conductive whiskers, conductive metal oxide, and polyphenylene derivatives, or a mixture of two or more thereof.

6. The positive electrode for a secondary battery of claim 1, wherein the first pores are pores between the conductive agent-the conductive agent which are formed by being surrounded by adjacent conductive agent particles, and
the second pores are pores between the conductive agent-the positive electrode active material which are formed by being surrounded by the adjacent conductive agent and positive electrode active material,
wherein outer surfaces of the first and second pores are respectively nonlinear along surfaces of pluralities of adjacent conductive agent and positive electrode active material particles.

7. The positive electrode for a secondary battery of claim 1, wherein the average diameter of the first pores is in a range of 1 nm to 100 nm, and
the average diameter of the second pores is in a range of 100 nm to 500 nm.

8. The positive electrode for a secondary battery of claim 7, wherein the average diameter of the second pores is in a range of 200 nm to 400 nm.

9. The positive electrode for a secondary battery of claim 1, wherein the positive electrode has an energy density per unit area of 0.8 mAh/cm$^2$ to 1.8 mAh/cm$^2$.

10. A method of preparing a positive electrode for a secondary battery, the method comprising:
preparing a positive electrode active material slurry having a solid content of 60 wt % to 90 wt % by mixing a conductive agent with a positive electrode active material at a volume ratio of 0.08:1 to 0.32:1;
preparing a positive electrode including a positive electrode material mixture layer having a porosity of 55 vol % to 65 vol % by coating a positive electrode collector with the positive electrode active material slurry and drying the coated positive electrode collector;
performing primary rolling of the positive electrode to prepare a positive electrode including a positive electrode material mixture layer having a porosity of 53 vol % to 57 vol %;
performing secondary rolling of the positive electrode prepared after the primary rolling to prepare a positive electrode including a positive electrode material mixture layer having a porosity of 30 vol % to 45 vol %; and
performing tertiary rolling of the positive electrode prepared after the secondary rolling to prepare a positive electrode including a positive electrode material mixture layer having a porosity of 30 vol % to 45 vol %.

11. The method of claim 10, wherein the positive electrode active material slurry is coated with a loading amount of 2 mg/cm$^2$ to 15 mg/cm$^2$.

12. The method of claim 10, wherein the primary rolling is performed under conditions in which a gap between two top rolls and a bottom roll at room temperature is (total thickness of the positive electrode before the primary rolling+total thickness of the positive electrode targeted after the tertiary rolling)/2.

13. The method of claim 10, wherein the secondary rolling and the tertiary rolling are performed under conditions in which a gap between two top rolls and a bottom roll at room temperature is the same as a total thickness of the positive electrode targeted after the tertiary rolling.

14. The method of claim 10, further comprising allowing the positive electrode prepared after the primary rolling to be left standing for 30 minutes to 2 hours before the secondary rolling.

15. The method of claim 10, further comprising allowing the positive electrode prepared after the secondary rolling to be left standing for 30 minutes to 2 hours before the tertiary rolling.

16. A lithium secondary battery comprising:
a positive electrode;
a negative electrode;
a separator disposed between the positive electrode and the negative electrode; and
a non-aqueous electrolyte solution,
wherein the positive electrode comprises the positive electrode of claim 1.

* * * * *